United States Patent [19]

Oberle et al.

[11] Patent Number: 4,890,678

[45] Date of Patent: Jan. 2, 1990

[54] SOIL-WORKING FARM MACHINE

[75] Inventors: Edmond Oberle; Bernard Wattron, both of Saverne, France

[73] Assignee: Kuhn S.A., Saverne, France

[21] Appl. No.: 177,481

[22] Filed: Apr. 1, 1988

[30] Foreign Application Priority Data

Apr. 13, 1987 [FR] France ............................ 87 05336

[51] Int. Cl.⁴ .............................................. A01B 19/06
[52] U.S. Cl. ...................................... 172/54.5; 172/102
[58] Field of Search ...................... 172/54.5, 101, 102, 172/99, 52

[56] References Cited

U.S. PATENT DOCUMENTS

| 1,844,455 | 2/1932 | Anderson | 172/54.5 |
| 3,627,056 | 12/1971 | Rogers | 172/102 |
| 3,791,453 | 2/1974 | Oosterling | 172/54.5 |
| 4,178,996 | 12/1978 | Van der Lely | 172/54.5 |
| 4,314,609 | 2/1982 | Chauvet | 172/54.5 |

FOREIGN PATENT DOCUMENTS

| 810673 | 8/1951 | Fed. Rep. of Germany . |
| 2750106 | 5/1979 | Fed. Rep. of Germany ..... 172/54.5 |
| 956579 | 4/1949 | France ............................ 172/54.5 |
| 1389186 | 1/1965 | France . |
| 1554614 | 1/1969 | France . |
| 404275 | 6/1966 | Switzerland . |
| 1074385 | 7/1967 | United Kingdom ............... 172/54.5 |

Primary Examiner—Richard J. Johnson
Attorney, Agent, or Firm—Oblon, Spivak, McClelland, Maier & Neustadt

[57] ABSTRACT

A soil-working farm machine including a frame 1 provided with a device 20 for hitching to a tractor vehicle. At least one row 6, 7 of two bars 2, 3, or 4, 5 equipped with soil-working tools 21 and having a phase opposition movement is connected to said frame by a plurality of oscillating arms 9, 10, 11, 12. The phase opposition movement is generated by a mechanism for transformation of the rotary movement received from a driving source into a reciprocating movement crosswise to the forward direction. The mechanism includes a connecting rod-eccentric device 22 supported by the frame 1. The connecting rod 30, 31, 32, 33 serve to transmit the reciprocating movement to corresponding bars 2, 3, 4, 5. The oscillating arms 9, 10, 11, 12 are connected, on the one hand, to the frame 1 by a connection 13, 15, 17, 15 with an axis directed at least approximately parallel to the forward direction 8 and, on the other hand, to the corresponding bar 2, 3, 4, 5 by a connection 14, 16, 18, 19 with an axis also directed at least approximately parallel to the forward direction. Each connecting rod 30, 31, 32, 33 is connected by a connection 35 with an axis directed at least approximately parallel to the forward direction 8 to an oscillating arm 10, 12 of the corresponding bar 2, 3, 4, 5.

19 Claims, 7 Drawing Sheets

SOIL-WORKING FARM MACHINE

FIELD OF THE INVENTION

This invention relates to a soil-working farm machine comprising a frame provided with a device for hitching to a tractor vehicle. At least one transverse row of two bars equipped with soil-working tools and having a phase opposition movement is connected to the frame by a plurality of oscillating arms. The phase opposition movement is generated by a mechanism for transformation of the rotary movement received from a driving source into a reciprocating movement crosswise to the forward direction. This mechanism for transformation comprises a connecting rod-eccentric device supported by the frame. Each connecting rod serves to transmit the reciprocating movement to the corresponding bar, and the oscillating arms are connected, on the one hand, to the frame by a connection with an axis directed at least approximately parallel to the forward direction and, on the other hand, to the corresponding bar by a connection with an axis also directed at least approximately parallel to the forward direction.

BACKGROUND OF THE INVENTION

Such a soil-working farm machine is known the connecting rods of which serving to transmit the reciprocating movement to the corresponding bar are relatively short and are connected to the corresponding bar by a yoke fastened to the end of the bar extending close to the connecting rod-eccentric device. Each yoke extends upward from the corresponding bar. Each connecting rod has a small end connected to its corresponding yoke by means of a connection with an axis directed at least approximately parallel to the forward direction and a big end connected to its corresponding eccentric.

The known device, however, has a number of drawbacks.

First, to insure that the connecting rod-eccentric device cannot be soiled, it must be located relatively high, far from the worked soil. Therefore, the connecting point of a connecting rod to its corresponding yoke is also located relatively high, which means that the height of the yoke is relatively great.

Second, because of the great forces that each connecting rod is to transmit to its corresponding yoke to drive its corresponding bar, there appear, after the machine has been in use for a while, breaks of the bar at the spot where the connection of the yoke to the bar stops. To avoid these breakage problems with the known design would require such a reinforcement of the bars that their weight would be unacceptably increased.

OBJECT OF THE INVENTION

The object of this invention is to remedy the foregoing breakage problem without unacceptably increasing the weight of the bars.

SUMMARY OF THE INVENTION

For this purpose, the soil-working farm machine according to the invention is characterized by the fact that each connecting rod is connected by a connection with an axis directed at least approximately parallel to the forward direction to an oscillating arm of its corresponding bar. Thanks to this arrangement, the transmission of the driving force in a bar no longer generates great bending stresses in the bar, as is the case in the known machine. The bar breakage problems are thus solved without the weight of the bars being significantly changed.

Preferably, each connecting rod is connected to the oscillating arm of its corresponding bar extending close to the connecting rod-eccentric device. The weight of the connecting rods is thus advantageously reduced.

According to an additional characteristic of the invention, the oscillating arm driven by a connecting rod is extended upward beyond its connection to the frame, the connecting rod being connected to the part of the oscillating arm extended upward beyond the connection. This arrangement makes it possible to move the connecting rod-eccentric device away to a maximum from the worked soil without, however, increasing the height of the frame and while maintaining a certain balancing of the various masses in movement.

The balancing of the masses in movement is achieved in an optimal way when the connecting rods, which exhibit a plane of symmetry containing the axis of their small end and of their big end, and which are connected to two adjacent bars of the same row having phase opposition movements, are arranged so that, when the connecting rods are at the dead center of their crosswise alternating movement, their planes of symmetry are merged, are horizontal, and contain the axis of rotation of the shaft of the connecting rod-eccentric device.

According to an additional characteristic of the invention, the farm machine comprises two rows of bars placed behind one another, considering the direction of forward movement. The driven oscillating arms of two bars extending directly behind one another, considering the forward direction, are placed behind one another. Advantageously, the driven oscillating arms placed behind one another are mounted on a common shaft. The common shaft is fastened to the frame and constitute the connection of the driven oscillating arms to the frame.

Preferably an intermediate bearing, solid with the frame, is placed between the two driven oscillating arms. The intermediate bearing supports the center part of the common shaft. The common shaft can thus well resist the stresses to which it is subjected during work.

The connections of the driven oscillating arms preferably comprise roller bearings, which gives them a long life. For the same purpose, the connection of each connecting rod to its corresponding driven oscillating arm also preferably comprises a roller bearing.

Other advantages and characteristics of the invention will become apparent from the following description of two nonlimiting embodiments of the invention.

DETAILED DESCRIPTION OF THE PRESENTLY PREFERRED EMBODIMENTS

The First Embodiment

Figure 1:
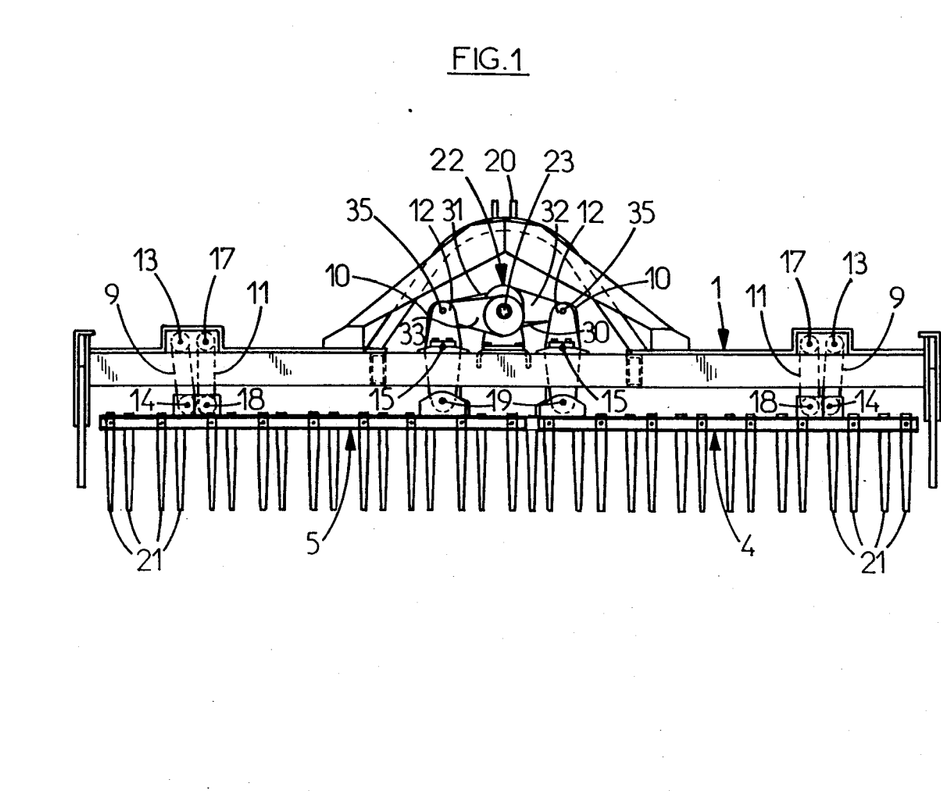
FIG. 1 is a rear view of a soil-working machine according to the invention.
Figure 2:
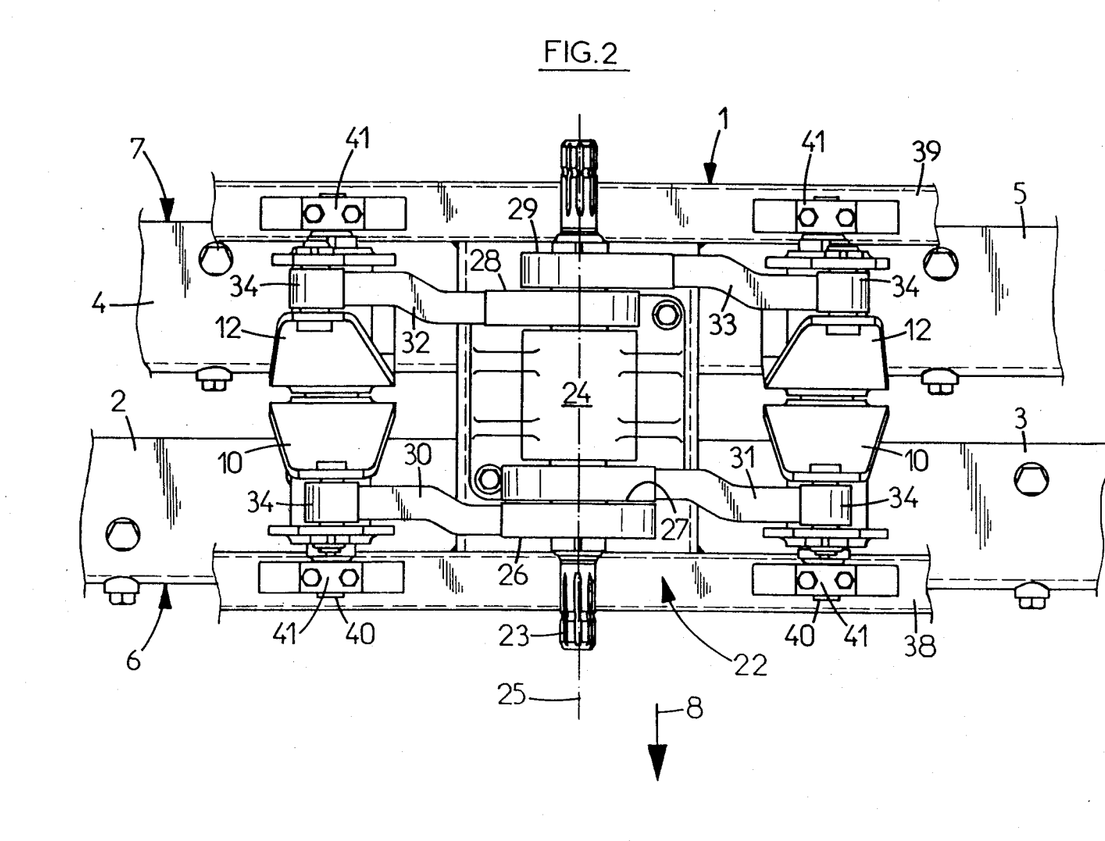
FIG. 2 is a top view on an enlarged scale of the center part of the machine shown in FIG. 1 where the connecting rod-eccentric device is placed, with the hitching device removed for greater clarity.

FIG. 1 shows a soil-working farm machine according to the invention. The soil-working farm machine includes a frame 1 to which are connected tool bars 2, 3, 4, and 5. As can be seen in FIG. 2, the tool bars 2, 3, 4, and 5 are distributed in a front row 6 and a back row 7 placed behind the front row 6, considering the forward working direction 8 (see FIGS. 2, 4, and 7).

The tool bars 2, 3 of the front row 6 are connected to the frame 1 by outside oscillating arms 9 and inside oscillating arms 10, while the tool bars 4, 5 of the back row 7 are connected to the frame 1 by outside oscillating arms 11 and inside oscillating arms 12.

The outside oscillating arms 9 of the tool bars 2, 3 of the front row 6 are connected to the frame 1 by connections 13 and to the corresponding tool bars 2, 3 by connections 14, while the inside oscillating arms 10 of the tool bars 2, 3 are connected to the frame 1 by connections 15 and to the corresponding tool bars 2, 3 by connections 16 (see FIGS. 3, 4, 6, and 7).

The outside oscillating arms 11 of the tool bars 4, 5 of the back row 7 are connected to the frame 1 by connections 17 and to the corresponding tool bar 4, 5 by connections 18, while the inside oscillating arms 12 of the tool bars 4, 5 are connected to the frame 1 by connections 15 and to the corresponding tool bars 4, 5 by connections 19.

Each of the connections 13, 14, 15, 16, 17, 18, 15, 19 has an axis directed at least approximately parallel to the forward working direction 8.

The outside oscillating arms 9, 11 of the tool bars 2, 4 and the outside oscillating arms 9, 11 of the tool bars 3, 5 are placed side by side in a direction crosswise to the forward working direction 8, while the inside oscillating arms 10, 12 of the tool bars 2, 4 and the inside oscillating arms 10, 12 of the tool bars 3, 5 are placed behind one another in a direction at least approximately parallel to the forward direction 8.

The machine is also equipped with a hitching device 20 making it possible to couple it, for example, to the three point hitching system of a tractor vehicle (not shown).

Each tool bar 2, 3, 4, 5 is provided with a plurality of soil-working tools 21 such as, for example, teeth.

The tool bars 2, 3, 4, 5 are driven in an alternating reciprocating movement crosswise to the forward working direction 8 by a connecting rod-eccentric device 22 fastened to the upper part of the center part of the frame 1. The connecting rod-eccentric device 22 is represented in top view in FIG. 2, in front view in FIGS. 3 and 6, and in rear view in FIG. 5.

The connecting rod-eccentric device 22 is, per se, conventional. It comprises a shaft 23 guided in rotation in a bearing 24 fastened to the frame 1. The shaft 23 has an axis of rotation 25 directed at least approximately parallel to the forward working direction 8. The shaft 23 is driven in a way known to a person of ordinary skill in the art from the power takeoff of the tractor vehicle (not shown) to which is hitched the soil-working farm machine.

In front of the bearing 24, the shaft 23 supports two eccentrics 26, 27. Similarly, behind the bearing 24, the shaft 23 supports two eccentrics 28, 29. The eccentrics 26, 27, 28, 29 are connected to and drive corresponding tool bars 2, 3, 4, 5 by means of connecting rods 30, 31, 32, 33. Each connecting rod 30, 31, 32, 33 has a small end 34 and a big end 37. The eccentrics 26, 27 driving the front tool bars 2, 3 are in phase opposition. Also, the eccentrics 28, 29 driving the back tool bars 4, 5 are in phase opposition. Furthermore, the eccentrics 28, 29 of the back tool bars 4, 5 are offset by 90° relative to the eccentrics 26, 27 of the front bars 2, 3.

In FIGS. 1 and 3 to 7, it is seen that the inside oscillating arms 10, 12 are extended upward, beyond their connection 15 to the frame 1. To the upper part of each extension is fastened the small end 34 of the corresponding connecting rod 30, 31, 32, 33 by means of a connection 35 with an axis directed at least approximately parallel to the forward working direction 8. Each connecting rod 30, 31, 32, 33 thus transmits the alternating movement that it receives from its corresponding eccentric 26, 27, 28, 29 to its corresponding tool bar 2, 3, 4, 5 via the inside oscillating arm 10, 12 of the corresponding tool bar 2, 3, 4, 5.

Figure 3:
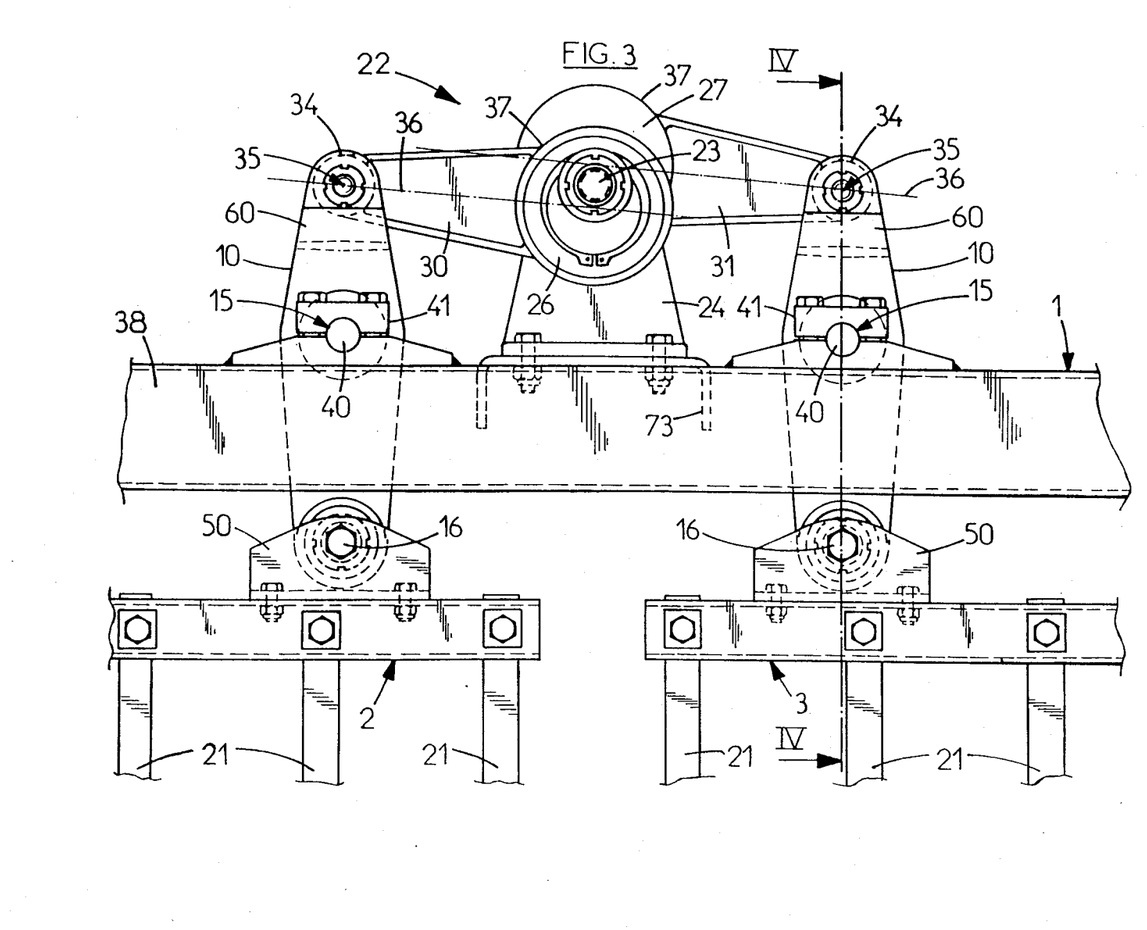
FIG. 3 is a front view on an enlarged scale of the center part of the machine shown in FIG. 2. For clarity, only the front row of bars has been represented.
Figure 5:
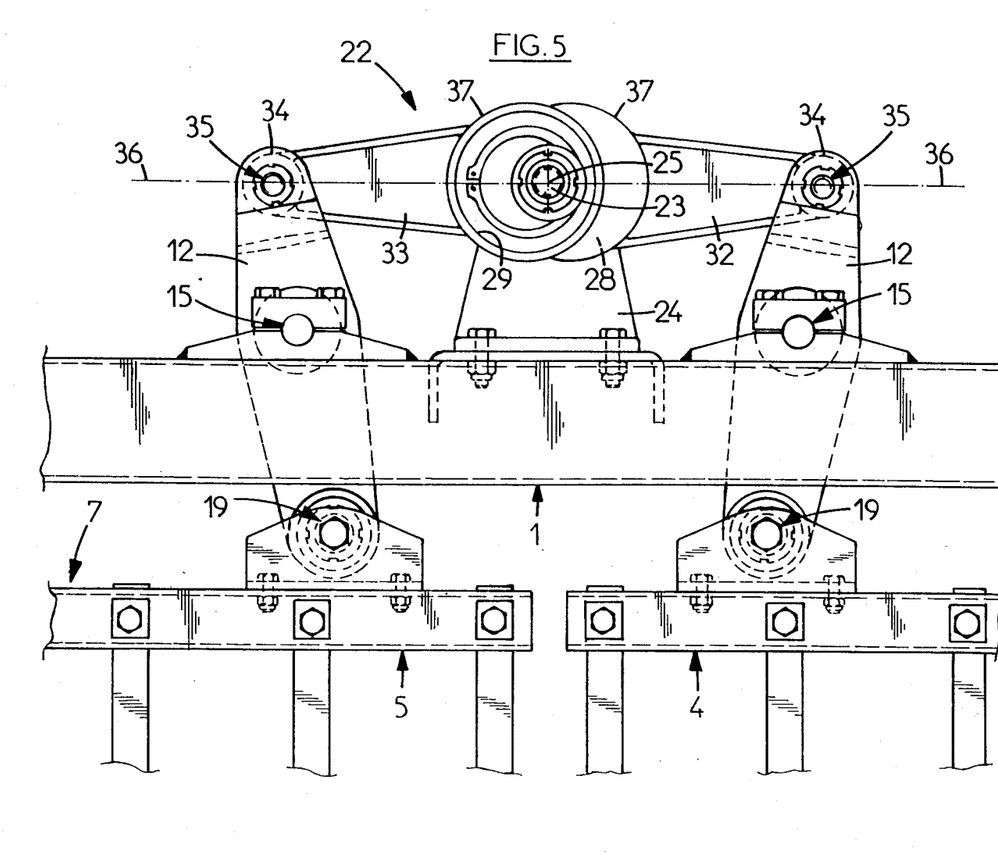
FIG. 5 is a rear view of the center part of the machine shown in FIG. 2. For clarity, only the back row of bars has been represented.
Figure 6:
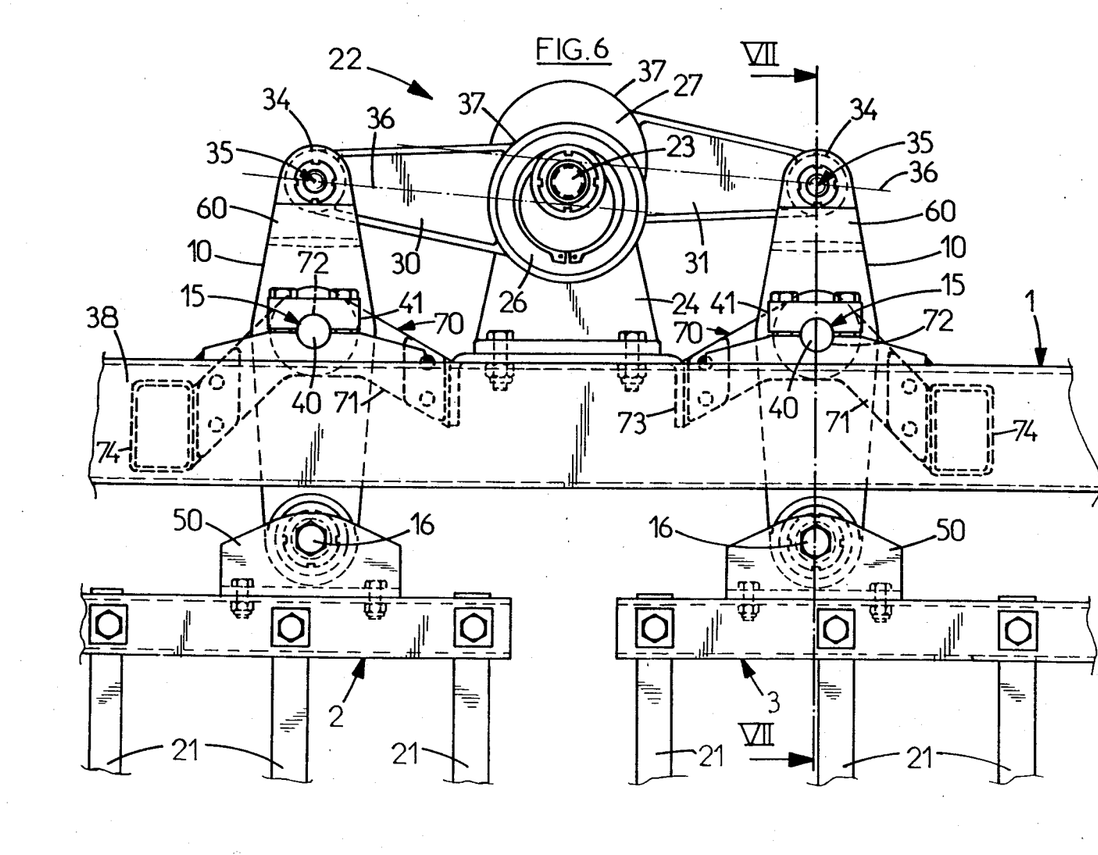
FIG. 6 is a view similar to that of FIG. 3 of a second embodiment.

FIGS. 3, 5, and 6 show the connecting rods 30, 31 driving the front tool bars 2, 3 in one of the center positions of their crosswise alternating movement and the connecting rods 32, 33 driving the back tool bars 4, 5 in one of the end positions of their crosswise alternating movement. However, it will be understood that, during the rotation of the shaft 23 of the connecting rod-eccentric device 22, the connecting rods 30, 31 driving the front tool bars 2, 3 will, at a given moment, be in one of the end positions of their crosswise alternating movement at the same instant that the connecting rods 32, 33 driving the back tool bars 4, 5 are in one of the central positions of their crosswise alternating movement.

As can be seen in FIGS. 3, 5, and 6, the connecting rods 30, 31, 32, 33 each exhibit a plane of symmetry 36 containing the axis of their small end 34 and of their big end 37. It is also seen in FIG. 5 that the connecting rods 30, 31, 32, 33 are arranged so that, when the two connecting rods 32, 33 or 30, 31 driving the corresponding bar 4, 5 or 2, 3 are at the dead center of their crosswise alternating movement, their planes of symmetry 36 are merged, are horizontal, and contain the axis of rotation 25 of the shaft 23 of the connecting rod-eccentric device 22. This arrangement makes possible an optimal balancing of the masses in movement.

Figure 4:
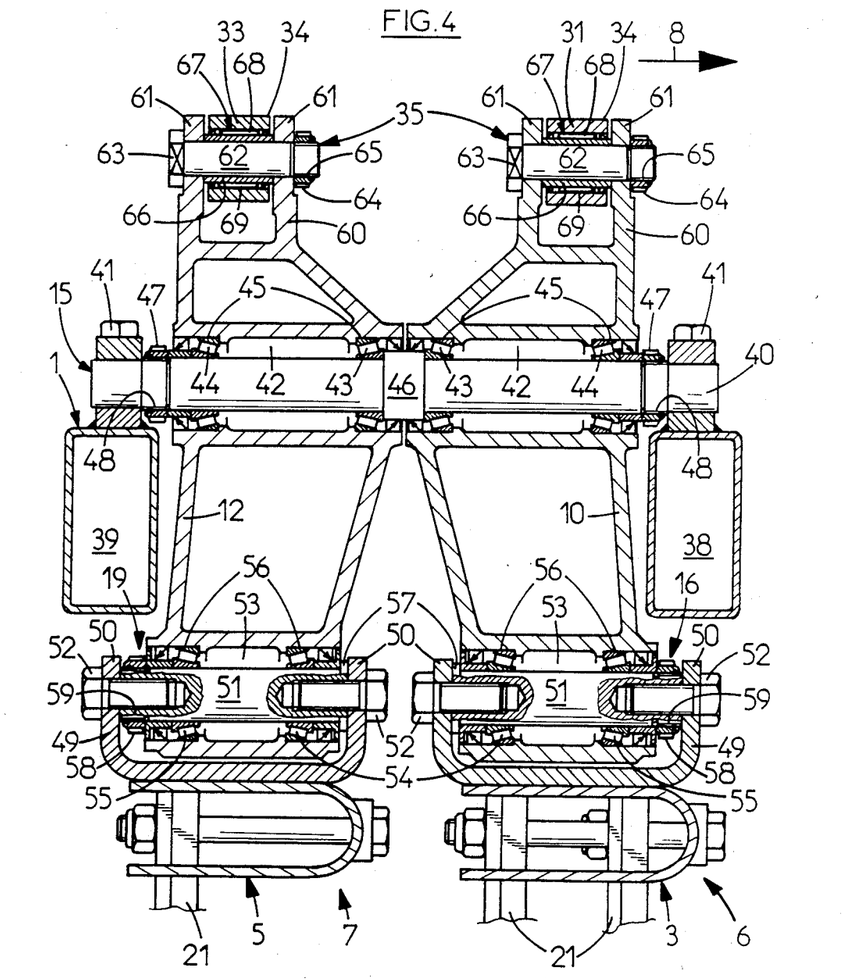
FIG. 4 is a section along the line IV—IV in FIG. 3.

FIG. 4 shows in detail the assembly of the inside oscillating arm 10 of the front tool bar 3 and of the inside oscillating arm 12 of the back tool bar 5. However, it will be understood that assembly of the oscillating arm 10 of the front tool bar 2 and of the oscillating arm 12 of the back tool bar 4 is done in the same way.

As said above, the inside oscillating arm 10 of a front bar 2 or 3 is placed, considering the forward working direction 8, in front of the inside oscillating arm 12 of the corresponding back tool bar 4 or 5. The two inside oscillating arms 10, 12 extend between two beams 38, 39 which are part of the frame 1. The connection 15 of the inside oscillating arms 10, 12 to the frame 1 comprises a common shaft 40 extending above the two beams 38, 39. Fastening of the common shaft 40 to the frame 1 is achieved by two flanges 41, each of which is fastened to one of the beams 38, 39.

The connection 15 of each inside oscillating arm 10, 12 to the frame 1 further comprises a roller bearing 42. Each inside oscillating arm 10, 12 contains a bore 45, and the two bores 45 are coaxial with one another. Each roller bearing 42 comprises two bearings 43, 44 extending between the bore 45 of the corresponding inside oscillating arm 10, 12 and the common shaft 40. The axial connection of each inside oscillating arm 10, 12 to the common shaft 40 is achieved, on the one hand, by a collar 46 made in the center part of the common shaft 40 and, on the other hand, by a nut 47 screwed onto a threaded part 48 of the common shaft 40. The bearings 43 of the roller bearings 42 bear against opposite abutting surfaces of the collar 46, and the bearings 44 of the roller bearings 42 bear against the corresponding nut 47. The other details of assembly of the bearings 43, 44 are within the reach of a person of ordinary skill in the art.

As can be seen in FIG. 4, the connection 19 of an inside oscillating arm 12 to the tool bar 4 or 5 is identical with the connection 16 of an inside oscillating arm 10 to the tool bar 2 or 3.

Each connection 16, 19 comprises a yoke 49 having two wings 50. Each yoke 49 is fastened to the upper part of the corresponding tool bar 2, 3 or 4, 5. Each yoke 49 is open upward, and between its two wings 50 a pin 51 is fastened by means of two bolts 52. Each inside oscillating arm 10, 12 also contains a bore 56, and each connection 16, 19 further comprises a roller bearing 53. Each roller bearing 53 comprises two bearings 54, 55 extending between the bore 56 made in the lower part of the corresponding inside oscillating arm 10, 12 and the corresponding pin 51. The axial connection of each pin 51 in the corresponding oscillating arm 10, 12 is made, on the one hand, by a shoulder 57 made on the pin 51 and against which the bearing 54 bears and, on the other hand, by a nut 58 screwed onto a threaded part 59 of the pin 51 and which bears against the bearing 55. The other details of assembly of the bearings 54, 55 are also within the reach of a person of ordinary skill in the art.

It is seen in FIG. 4 that the bearings 43, 44 of the connections 15 and the bearings 54, 55 of the connections 16, 19 are advantageously conical roller bearings.

As also said above, the small end 34 of each connecting rod 30, 31, 32, 33 is connected to the upper part of the part of the inside oscillating arm 10, 12 extended upward beyond the connection 15 by means of a connection 35. For this purpose, the connection 35 comprises a yoke 60 made in said upper part. The yoke 60 is opened upward and has two wings 61. Between the two wings 61 of each yoke 60 the small end 34 of the corresponding connecting rod 30, 31, 32, 33 extends.

Each connection 35 further comprises a pin 62 fastened between the two wings 61 of the corresponding yoke 60. The axial connection of each pin 62 relative to the corresponding yoke 60 is achieved by a shoulder 63 made at one end of the pin 62 and by a nut 64 screwed onto a threaded part 65 made at the other end of the pin 62. To avoid deforming the two wings 61 of the yoke 60 during screwing of the nut 64 onto the threaded part 65 of the pin 62, a spacer ring 66 is placed between the inside of the two wings 61.

Finally, each connection 35 also comprises a roller bearing 67. Each roller bearing 67 comprises a needle bearing 68 extending between a bore 69 made in the small end 34 of the corresponding connecting rod 30, 31, 32, 33 and the spacer ring 66 centered on the pin 62.

The Second Embodiment

Figure 7:
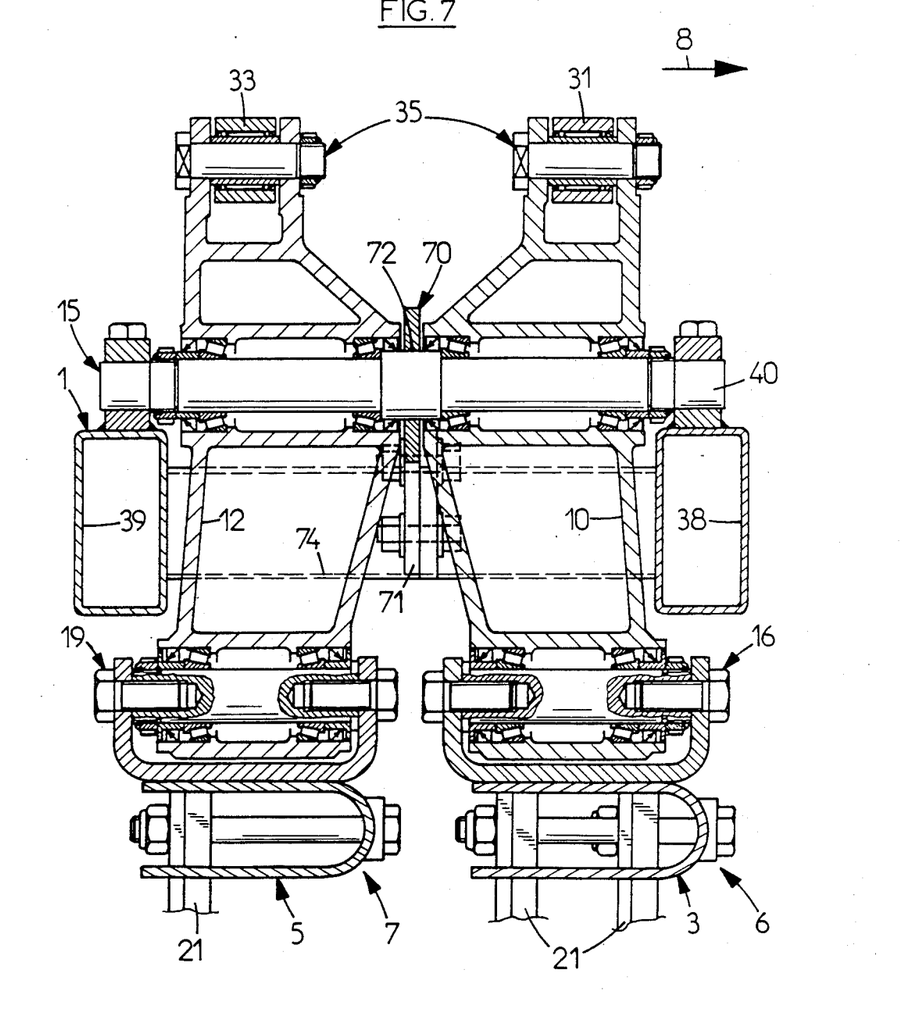
FIG. 7 is a section along the line VII—VII in FIG. 6.

A second embodiment is represented in FIGS. 6 and 7. As can be seen, the second embodiment comprises numerous elements which are identical to the corresponding elements of the first embodiment. Those elements therefore will not be redescribed.

The second embodiment differs from the first embodiment by the fact that an intermediate bearing 70 extends between the two inside oscillating arms 10, 12 assembled on the common shaft 40. The intermediate bearing 70 supports the center part of the common shaft 40. As can be seen in FIG. 6, the intermediate bearing 70 consists of an arch 71 which comprises in its center part a bore 72 in which the common shaft 40 is centered. At its end directed toward the connecting rod-eccentric device 22, the arch 71 is fastened to a cross member 73 extending between the two beams 38, 39. The bearing 24 of the connecting rod-eccentric device 22 is fastened to the cross member 73. At its other end, the arch 71 is fastened to a cross member 74 also extending between the two beams 38, 39.

The arch 71 avoids the bending of the center part of the common shaft 40 which could be generated by the driving force. This second embodiment therefore is particularly intended for soil-working farm machines with great working width.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A soil-working farm machine comprising:
   (a) a frame;
   (b) a device for hitching said frame to a tractor vehicle;
   (c) at least two transverse rows placed behind one another, considering the working direction of said soil-working farm machine, each one of said two transverse rows comprising two tool bars, each one of said tool bars being equipped with a plurality of soil-working tools;
   (d) a plurality of oscillating arms connecting each one of said tool bars to said frame in such a manner that each one of said tool bars is connected to said frame by at least two oscillating arms at least one of which is a driven oscillating arm; and
   (e) means for giving said two tool bars in each one of said two transverse rows phase opposition movement, said means comprising a mechanism for the transformation of rotary movement received from a driving source into a reciprocating movement of said tool bars crosswise to the working direction of said soil-working farm machine, said mechanism comprising a connecting rod-eccentric device supported by said frame, said connecting rod-eccentric device comprising a plurality of connecting rods each one of which serves, during use of said soil-working farm machine, to transmit the reciprocating movement to a corresponding one of said tool bars via a corresponding driven oscillating arm, wherein:
   (f) each one of said plurality of oscillating arms is connected to said frame by a connection having an axis directed at least approximately parallel to the working direction of said soil-working farm machine and is connected to the corresponding one of said tool bars by a connection having an axis directed at least approximately parallel to the working direction of said soil-working farm machine;
   (g) each one of said plurality of connecting rods is connected to the corresponding eccentric by a first connection and to the corresponding driven oscillating arm by a second connection, said first connection and said second connection having each an axis directed at least approximately parallel to the working direction of said soil-working farm machine and said connecting rod exhibits a plane of symmetry containing the axis of said first connection and the axis of said second connection;

(h) said driven oscillating arm of each one of said tool bars is the oscillating arm which extends closest to said connecting rod-eccentric device;

(i) said connecting rod-eccentric device comprises a shaft having an axis of rotation at least approximately parallel to the working direction of said soil-working machine and on which are mounted said eccentrics; and (j) said connecting rods of said two tool bars in each one of said two transverse rows are arranged so that, when said connecting rods are at a dead center of their crosswise reciprocating movement, their planes of symmetry are merged, are horizontal, and contain the axis of rotation of said shaft of said connecting rod-eccentric device.

2. A soil-working farm machine according to claim 1 wherein:
(a) each one of said driven oscillating arms has a part which extends upward beyond the connection of said driven oscillating arm to said frame and
(b) the corresponding connecting rod is connected to said part.

3. A soil-working farm machine according to claim 1 wherein said driven oscillating arms of said two tool bars extending directly behind one another in said at least two transverse rows, considering the working direction of said soil-working farm machine, are placed behind one another.

4. A soil-working farm machine according to claim 3 wherein said connection of said driven oscillating arms which extend directly behind one another comprise a common shaft fastened to said frame and on which said driven oscillating arms pivot.

5. A soil-working farm machine according to claim 4 wherein an intermediate bearing is arranged between said driven oscillating arms which extend directly behind one another, said intermediate bearing being solid with said frame and supporting a center part of said common shaft.

6. A soil-working farm machine according to claim 1 wherein said connections of said driven oscillating arms comprise roller bearings.

7. A soil-working farm machine according to claim 1 wherein said connection of each one of said plurality of connecting rods to the corresponding one of said driven oscillating arms comprises a roller bearing.

8. A soil-working farm machine comprising:
(a) a frame;
(b) a device for hitching said frame to a tractor vehicle;
(c) at least two transverse rows placed behind one another, considering the working direction of said soil-working farm machine, each one of said two transverse rows comprising two tool bars, each one of said tool bars being equipped with a plurality of soil-working tools;
(d) a plurality of oscillating arms connecting each one of said tool bars to said frame in such a manner that each one of said tool bars is connected to said frame by at least two oscillating arms at least one of which is a driven oscillating arm; and
(e) means for giving said two tool bars in each one of said two transverse rows phase opposition movement, said means comprising a mechanism for the transformation of rotary movement received from a driving source into a reciprocal movement of said tool bars crosswise to the working direction of said soil-working farm machine, said mechanism comprising a connecting rod-eccentric device supported by said frame, said connecting rod-eccentric device comprising a plurality of connecting rods each one of which serves, during use of said soil-working farm machine, to transmit the reciprocal movement to a corresponding one of said tool bars via a corresponding drive oscillating arm, wherein:
(f) each one of said plurality of oscillating arms is connected to said frame by a connection having an axis directed at least approximately parallel to the working direction of said soil-working farm machine and is connected to the corresponding one of said tool bars by a connection having an axis directed at least approximately parallel to the working direction of said soil-working farm machine;
(g) each one of said plurality of connecting rods is connected to the corresponding driven oscillating arm by a connection having an axis directed at least approximately parallel to the working direction of said soil-working farm machine;
(h) said driven oscillating arms of said two tool bars extending directly behind one another in said at least two transverse rows, considering the working direction of said soil-working farm machine, are placed behind one another;
(i) said connection of said driven oscillating arms which extend directly behind one another comprise a common shaft fastened to said frame and on which said driven oscillating arms pivot; and
(j) the driven oscillating arm of each one of said tool bars is the oscillating arm which extends closest to said connecting rod-eccentric device.

9. A soil-working farm machine according to claim 8 wherein:
(a) each one of said driven oscillating arms has a part which extends upward beyond the connection of said driven oscillating arm to said frame and
(b) the corresponding connecting rod is connected to said part.

10. A soil-working farm machine according to claim 1 wherein said connections of said driven oscillating arms comprise roller bearings.

11. A soil-working farm machine according to claim 1 wherein said connection of each one of said plurality of connecting rods to the corresponding one of said driven oscillating arms comprises a roller bearing.

12. A soil-working farm machine comprising:
(a) a frame;
(b) a device for hitching said frame to a tractor vehicle;
(c) at least two transverse rows placed behind one another, considering the working direction of said soil-working farm machine, each one of said two transverse rows comprising two tool bars, each one of said tool bars being equipped with a plurality of soil-working tools;
(d) a plurality of oscillating arms connecting each one of said tool bars to said frame in such a manner that each one of said tool bars is connected to said frame by at least two oscillating arms at least one of which is a driven oscillating arm; and (e) means for giving said two tool bars in each one of said two transverse rows phase opposition movement, said means comprising a mechanism for the transformation of rotary movement received from a driving source into a reciprocal movement of said tool bars crosswise to the working direction of said soil-working farm machine, said mechanism comprising a connecting rod-eccentric device supported by said frame, said connecting rod-eccentric device comprising a plurality of connecting rods each one of which serves, during use of said soil-working farm machine, to transmit the reciprocal movement to a corresponding one of said tool bars via a corresponding driven oscillating arm, wherein:

(f) each one of said plurality of oscillating arms is connected to said frame by a connection having an axis directed at least approximately parallel to the working direction of said soil-working farm machine and is connected to the corresponding one of said tool bars by a connection having an axis directed at least approximately parallel to the working direction of said soil-working farm machine;

(g) each one of said plurality of connecting rods is connected to the corresponding driven oscillating arm by a connection having an axis directed at least approximately parallel to the working direction of said soil-working farm machine;

(h) said driven oscillating arms of said two tool bars extending directly behind one another in said at least two transverse rows, considering the working direction of said soil-working farm machine, are placed behind one another;

(i) said connection of said driven oscillating arms which extend directly behind one another comprise a common shaft fastened to said frame and on which said driven oscillating arms pivot;

(j) said connecting rod-eccentric device comprises a shaft having an axis of rotation at least approximately parallel to the working direction of said soil-working machine and on which are mounted said eccentrics;

(k) each one of said plurality of connecting rods is connected to the corresponding eccentric by a connection having an axis directed at least approximately parallel to the working direction of said soil-working farm machine, said connecting rod exhibits a plane of symmetry containing said axis and the axis of the connection by means of which said connecting rod is connected to the corresponding driven oscillating arm; and (l) said connecting rods of said two tool bars in each one of said two transverse rows are arranged so that, when said connecting rods are at a dead center of their crosswise reciprocating movement, their planes of symmetry are merged, are horizontal, and contain the axis of rotation of said shaft of said connecting rod-eccentric device.

13. A soil-working farm machine according to claim 12 wherein:

(a) each one of said driven oscillating arms has a part which extends upward beyond the connection of said driven oscillating arm to said frame and (b) a corresponding connecting rod is connected to said part.

14. A soil-working farm machine according to claim 12 wherein said connections of said driven oscillating arms comprise roller bearings.

15. A soil-working farm machine according to claim 12 wherein said connection of each one of said plurality of connecting rods to the corresponding one of said driven oscillating arms comprises a roller bearing.

16. A soil-working farm machine comprising (a) a frame;

(b) a device for hitching said frame to a tractor vehicle;

(c) at least two transverse rows placed behind one another, considering the working direction of said soil-working farm machine, each one of said two transverse rows comprising two tool bars, each one of said tool bras being equipped with a plurality of soil-working tools;

(d) a plurality of oscillating arms connecting each one of said tool bars to said frame in such a manner that each one of said tool bars is connected to said frame by at least two oscillating arms at least one of which is driven oscillating arm; and (e) means for giving said two tool bars in each one of said two transverse rows phase opposition movement, said means comprising a mechanism for the transformation of rotary movement received from a driving source into a reciprocal movement of said tool bars crosswise to the working direction of said soil-working farm machine, said mechanism comprising a connecting rod-eccentric device supported by said frame, said connecting rod-eccentric device comprising a plurality of connecting rods each one of which serves, during use of said soil-working farm machine, to transmit the reciprocal movement to a corresponding one of said tool bars via a corresponding driven oscillating arm, wherein:

(f) each one of said plurality of oscillating arms is connected to said frame by a connection having an axis directed at least approximately parallel to the working direction of said soil-working farm machine and is connected to the corresponding one of said tool bars by a connection having an axis directed at least approximately parallel to the working direction of said soil-working farm machine;

(g) each one of said plurality of connecting rods is connected to the corresponding driven oscillating arm by a connection having an axis directed at least approximately parallel to the working direction of said soil-working farm machine;

(h) said driven oscillating arms of said two tool bars extending directly behind one another in said at least two transverse rows, considering the working direction of said soil-working farm machine, are placed behind one another;

(i) said connection of said driven oscillating arms which extend directly behind one another comprise a common shaft fastened to said frame and on which said driven oscillating arms pivot; and (j) an intermediate bearing is arranged between said driven oscillating arms which extend directly behind one another, said intermediate bearing being solid with said frame and supporting a center part of said common shaft.

17. A soil-working farm machine according to claim 16 wherein:

(a) each one of said driven oscillating arms has a part which extends upward beyond the connection of said driven oscillating arm to said frame and
(b) a corresponding connecting rod is connected to said part.

18. A soil-working farm machine according to claim 16 wherein said connections of said driven oscillating arms comprise roller bearings.

19. A soil-working farm machine according to claim 16 wherein said connection of each one of said plurality of connecting rods to the corresponding one of said driven oscillating arms comprises a roller bearing.

* * * * *

UNITED STATES PATENT AND TRADEMARK OFFICE
CERTIFICATE OF CORRECTION

PATENT NO. : 4,890,678
DATED : JANUARY 2, 1990
INVENTOR(S) : EDMOND OBERLE ET AL.

It is certified that error appears in the above-identified patent and that said Letters Patent is hereby corrected as shown below:

In the claims, column 8, line 16, delete "drive" and insert --driven--;

In the claims, column 8, line 51, delete "1" and insert --8--;

In the claims, column 8, line 54, delete "1" and insert --8--.

Signed and Sealed this

Twenty-seventh Day of August, 1991

Attest:

HARRY F. MANBECK, JR.

Attesting Officer

Commissioner of Patents and Trademarks